(12) United States Patent
Hoshino

(10) Patent No.: US 9,729,734 B2
(45) Date of Patent: Aug. 8, 2017

(54) INFORMATION PROCESSING APPARATUS, INFORMATION PROCESSING SYSTEM, AND NON-TRANSITORY COMPUTER READABLE MEDIUM

(71) Applicant: FUJI XEROX CO., LTD., Tokyo (JP)

(72) Inventor: Haruhisa Hoshino, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/019,373

(22) Filed: Feb. 9, 2016

(65) Prior Publication Data

US 2017/0078499 A1 Mar. 16, 2017

(30) Foreign Application Priority Data

Sep. 15, 2015 (JP) ................................. 2015-182320

(51) Int. Cl.
*G06F 3/12* (2006.01)
*H04N 1/00* (2006.01)

(52) U.S. Cl.
CPC ..... *H04N 1/00241* (2013.01); *H04N 1/00204* (2013.01); *H04N 1/00217* (2013.01); *H04N 2201/0081* (2013.01)

(58) Field of Classification Search
None
See application file for complete search history.

(56) References Cited

U.S. PATENT DOCUMENTS

| 7,318,084 | B2* | 1/2008 | Tanimoto | H04L 12/58 709/205 |
| 7,710,599 | B2* | 5/2010 | Miyamoto | H04N 1/00222 358/1.13 |
| 8,477,332 | B2* | 7/2013 | Shozaki | H04L 61/1523 358/1.15 |
| 2004/0199651 | A1* | 10/2004 | Kobayashi | G06F 3/1209 709/230 |
| 2005/0024666 | A1* | 2/2005 | Ohyama | H04N 1/00209 358/1.13 |
| 2015/0077796 | A1* | 3/2015 | Masuda | G06F 3/1222 358/1.15 |
| 2015/0181050 | A1* | 6/2015 | Nishii | H04N 1/00307 358/1.15 |

FOREIGN PATENT DOCUMENTS

JP 2007-060425 A 3/2007

* cited by examiner

*Primary Examiner* — Dung Tran
(74) *Attorney, Agent, or Firm* — Oliff PLC

(57) ABSTRACT

An information processing apparatus includes an accepting unit, a transmitting unit, a receiving unit, and a storing unit. The accepting unit accepts a transmission destination of input information for inputting setting information about a setting for the information processing apparatus. The transmitting unit transmits the input information to the transmission destination accepted by the accepting unit. The receiving unit receives the setting information transmitted from an external apparatus. The storing unit stores the setting information in a storage medium as a setting for the information processing apparatus. The setting information is received by the receiving unit.

8 Claims, 11 Drawing Sheets

Input an electronic mail address to which input information for inputting setting information is to be transmitted.

Transmission destination: UserA@aaa.co.jp

Transmit

FIG. 3

HEADER
To: UserA@aaa.co.jp
From: DeviceA@aaa.co.jp

BODY
Registration name:
Output destination:
User ID:
Password:

FIG. 4

HEADER
To: DeviceA@aaa.co.jp
From: UserA@aaa.co.jp

BODY
Registration name: UserA
Output destination: ¥¥UserA¥share¥image¥
User ID: UserA
Password: usera

--- USER INPUT

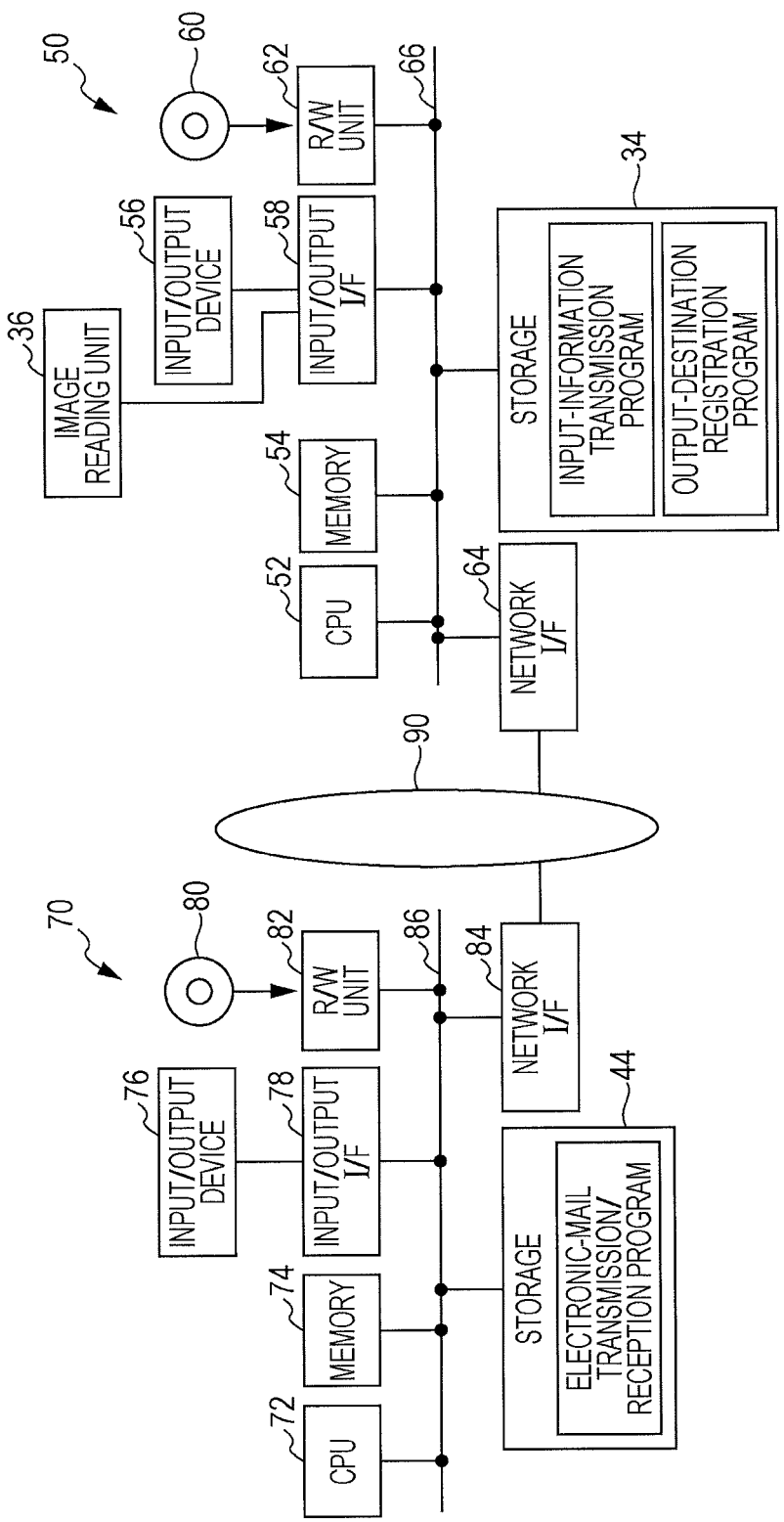

FIG. 10

HEADER | To: UserA@aaa.co.jp
From: DeviceA@aaa.co.jp

BODY | https://www.aaa.co.jp/setting

| Registration name | UserA |
| Output destination | ¥¥UserA¥share¥image¥ |
| User ID | UserA |
| Password | ***** |

Transmit

INFORMATION PROCESSING APPARATUS, INFORMATION PROCESSING SYSTEM, AND NON-TRANSITORY COMPUTER READABLE MEDIUM

CROSS-REFERENCE TO RELATED APPLICATIONS

This application is based on and claims priority under 35 USC 119 from Japanese Patent Application No. 2015-182320 filed Sep. 15, 2015.

BACKGROUND

Technical Field

The present invention relates to an information processing apparatus, an information processing system, and a non-transitory computer readable medium.

SUMMARY

According to an aspect of the invention, there is provided an information processing apparatus including an accepting unit, a transmitting unit, a receiving unit, and a storing unit. The accepting unit accepts a transmission destination of input information for inputting setting information about a setting for the information processing apparatus. The transmitting unit transmits the input information to the transmission destination accepted by the accepting unit. The receiving unit receives the setting information transmitted from an external apparatus. The storing unit stores the setting information in a storage medium as a setting for the information processing apparatus. The setting information is received by the receiving unit.

BRIEF DESCRIPTION OF THE DRAWINGS

Exemplary embodiments of the present invention will be described in detail based on the following figures, wherein:

FIG. 2 is a schematic diagram illustrating an exemplary transmission-destination input screen according to exemplary embodiments;

FIG. 3 is a schematic diagram illustrating an exemplary input-information mail according to the first exemplary embodiment;

FIG. 4 is a schematic diagram illustrating an exemplary setting-information mail according to the first exemplary embodiment;

FIG. 5 is a block diagram illustrating the schematic configuration of a computer system according to the exemplary embodiments;

FIG. 10 is a schematic diagram illustrating an exemplary input-information mail according to the second exemplary embodiment;

FIG. 11 is a schematic diagram illustrating an exemplary setting-information input screen according to the second exemplary embodiment;

DETAILED DESCRIPTION

Exemplary embodiments of the present invention will be described in detail below with reference to the drawings. Herein, description will be made on exemplary embodiments in which a user performs an operation on an image reading apparatus so that a storage in a terminal used by the user is set as an output destination to which an image data obtained by reading a document by using an image reading apparatus is output.

First Exemplary Embodiment

Figure 1:
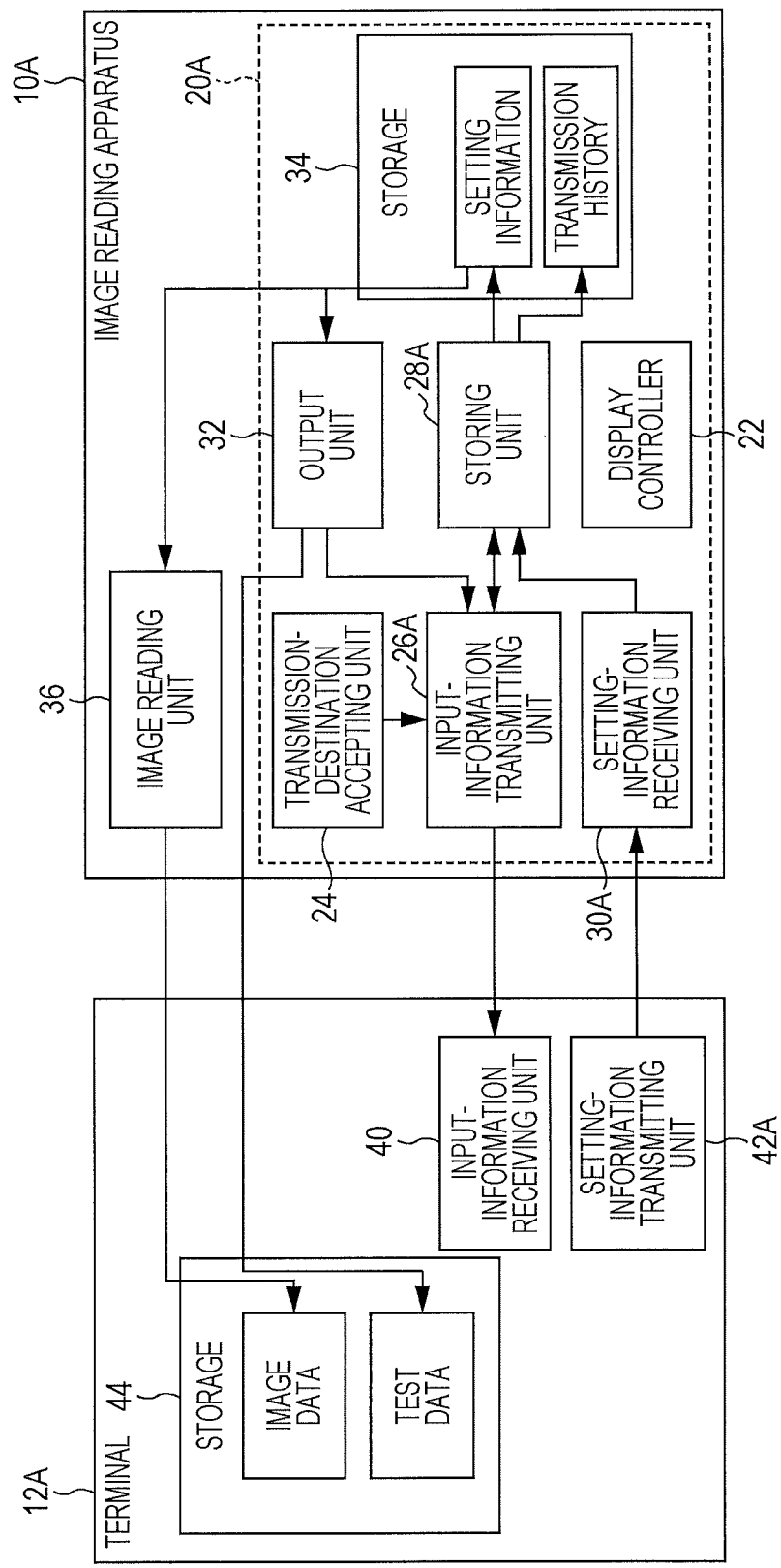
FIG. 1 is a functional block diagram illustrating the functional configuration of an image reading apparatus and a terminal according to a first exemplary embodiment.

FIG. 1 illustrates an image reading apparatus 10A and a terminal 12A which is an exemplary transmission-destination apparatus, according to a first exemplary embodiment. The configuration including the image reading apparatus 10A and the terminal 12A corresponds to an information processing system according to the first exemplary embodiment of the present invention.

The image reading apparatus 10A according to the first exemplary embodiment includes an information processing apparatus 20A and an image reading unit 36. The information processing apparatus 20A according to the first exemplary embodiment includes a display controller 22, a transmission-destination accepting unit 24, an input-information transmitting unit 26A, a storing unit 28A, a setting-information receiving unit 30A, an output unit 32, and a storage 34. The terminal 12A according to the first exemplary embodiment includes an input-information receiving unit 40, a setting-information transmitting unit 42A, and a storage 44.

The transmission-destination accepting unit 24 is an exemplary accepting unit according to an exemplary embodiment of the present invention. The input-information transmitting unit 26A is an exemplary transmitting unit according to an exemplary embodiment of the present invention. The storing unit 28A is an exemplary storing unit according to an exemplary embodiment of the present invention. The setting-information receiving unit 30A is an exemplary receiving unit according to an exemplary embodiment of the present invention. The output unit 32 is an exemplary output unit according to an exemplary embodiment of the present invention.

The display controller 22 according to the first exemplary embodiment displays information on a display device of an input/output device 56 (see FIG. 5) described below. In the first exemplary embodiment, when a user is to input setting information about a setting for the image reading apparatus 10A, the user instructs the image reading apparatus 10A to display a transmission-destination input screen for inputting a transmission destination for input information for inputting setting information, through the input/output device 56.

The setting information indicates information necessary to use the image reading apparatus 10A. For example, the setting information encompasses setting information necessary to use the image reading apparatus 10A itself, and setting information necessary to use the functions of the image reading apparatus 10A. Examples of the setting information necessary to use the image reading apparatus 10A itself include setting information about a network setting of the image reading apparatus 10A, setting information about setting of an address book, and setting information about setting of a display language used in a user interface (UI).

Examples of the setting information necessary to use the functions of the image reading apparatus 10A include setting information about setting of an output destination to which image data obtained by reading a document by using the image reading unit 36 is output, and setting information about a setting for image processing.

In the first exemplary embodiment, description will be made on a case in which output destination information about an output destination is used as the setting information. The output destination is used when image data obtained by reading a document by using the image reading unit 36 is output to an external storage medium of the image reading apparatus 10A.

For example, assume that a terminal setting button for performing a setting operation by using the terminal 12A is displayed on an output-destination setting screen which is used to set an output destination of image data and which is displayed on the display device of the input/output device 56. A user selects the terminal setting button on the output-destination setting screen, thereby instructing the image reading apparatus 10A to display a transmission-destination input screen.

When the user gives an instruction to display the transmission-destination input screen, the display controller 22 displays the transmission-destination input screen on the display device of the input/output device 56. FIG. 2 illustrates an exemplary transmission-destination input screen. As illustrated in FIG. 2, a message for prompting input of a transmission destination for input information, an entry field for a transmission destination, and a transmission button are displayed on the transmission-destination input screen according to the first exemplary embodiment.

When the transmission-destination input screen is displayed, the user inputs an electronic mail address of the user in the entry field, and selects the transmission button. FIG. 2 illustrates a state in which the user inputs "UserA@aaa.co.jp" which is an electronic mail address of the user, as the transmission destination for input information.

When the transmission button on the transmission-destination input screen is selected, the transmission-destination accepting unit 24 according to the first exemplary embodiment accepts the transmission destination for input information. The transmission-destination accepting unit 24 outputs the accepted transmission destination to the input-information transmitting unit 26A.

The input-information transmitting unit 26A according to the first exemplary embodiment transmits an electronic mail (hereinafter referred to as an "input-information mail") containing input information in the body of the mail, to the transmission destination received from the transmission-destination accepting unit 24, and outputs the transmission destination to the storing unit 28A. FIG. 3 illustrates an exemplary input-information mail.

As illustrated in FIG. 3, the transmission destination received from the transmission-destination accepting unit 24 is designated in the "To" field in the header of the input-information mail. In the "From" field in the header, "DeviceA@aaa.co.jp" which is an electronic mail address assigned to the image reading apparatus 10A is designated. Input information for inputting a registration name, an output destination, a user identifier (ID), and a password which are exemplary setting information is contained in the body of the input-information mail.

The registration name is a name for identifying a combination of the output destination, the user ID, and the password. The output destination is a path indicating an output destination for image data obtained by reading a document by using the image reading unit 36 (in the first exemplary embodiment, a universal naming convention (UNC) path). The user ID and the password are required when the output destination is accessed.

The storing unit 28A according to the first exemplary embodiment stores the transmission destination received from the input-information transmitting unit 26A, as a transmission history record in the storage 34.

After the user selects the transmission button on the transmission-destination input screen, the user uses the terminal 12A to perform an operation of receiving the electronic mail. When this operation is performed, the input-information receiving unit 40 receives the input-information mail transmitted from the image reading apparatus 10A.

When the user uses the terminal 12A to receive the input-information mail, the user performs an operation of transmitting an electronic mail (hereinafter referred to as a "setting-information mail") in which setting information is input in the body, as an electronic mail which is a reply to the input-information mail. When this operation is performed, the setting-information transmitting unit 42A transmits the setting-information mail to the image reading apparatus 10A. FIG. 4 illustrates an exemplary setting-information mail. In FIG. 4, setting information which is input by the user is surrounded by a dashed line.

As illustrated in FIG. 4, "DeviceA@aaa.co.jp" which is an electronic mail address of the transmission source of the input-information mail is designated in the "To" field in the header of the setting-information mail. In addition, "UserA@aaa.co.jp" which is assigned to the user and which is set in the terminal 12A is designated in the "From" field in the header.

"User A" is identification information which is unique in the image reading apparatus 10A. "\\UserA\share\image\" is a UNC path corresponding to a storage area in the storage 44 on the terminal 12A. "UserA" and "usera" are a user ID and a password which are required to access the UNC path.

The setting-information receiving unit 30A of the information processing apparatus 20A receives the setting-information mail transmitted from the terminal 12A. The setting-information receiving unit 30A outputs the received setting-information mail to the storing unit 28A.

When the transmission source (the electronic mail address in the "From" field in the header) of the setting-information mail received from the setting-information receiving unit 30A is present in the transmission history stored in the storage 34, the storing unit 28A extracts setting information from the body of the setting-information mail. The storing unit 28A stores the extracted setting information as a setting for the image reading apparatus 10A in the storage 34. The storing unit 28A deletes the transmission source from the transmission history after the setting information is stored in the storage 34.

The setting information is stored in the storage 34 by the storing unit 28A and is registered as a setting for the image reading apparatus 10A, whereby, for example, the image reading apparatus 10A performs the following processes: for example, when the user logs in the image reading apparatus 10A through user authentication using an ID card or the like, the screen display of the image reading apparatus 10A is automatically switched from the login screen to a transmission screen which is used to transmit image data obtained through reading and on which the output destination indicated by the setting information has been already input as the transmission destination for the image data.

The timing at which the storing unit 28A deletes an electronic mail address from the transmission history is not limited to this timing. For example, when a predetermined time (for example, one hour) has elapsed after a transmission destination received from the input-information transmitting unit 26A is stored as a transmission history record in the storage 34, the storing unit 28A may delete the transmission destination from the transmission history. Alternatively, for example, the storing unit 28A may delete a transmission history record at a timing at which the power supply switch of the image reading apparatus 10A is turned on or at a predetermined timing such as once per day.

When the transmission source of a setting-information mail received from the setting-information receiving unit 30A is not present in the transmission history stored in the storage 34, the storing unit 28A outputs, to the input-information transmitting unit 26A, a transmission instruction to transmit an electronic mail (hereinafter referred to as an "error mail") containing an error message in the body, to the transmission source. When the input-information transmitting unit 26A receives the transmission instruction from the storing unit 28A, the input-information transmitting unit 26A transmits the error mail to the transmission source.

The output unit 32 according to the first exemplary embodiment outputs test data to an output destination in accordance with setting information stored in the storage 34 as a setting for the image reading apparatus 10A by the storing unit 28A. The output unit 32 then outputs a processing result indicating success or failure in outputting of the test data, to the input-information transmitting unit 26A. When outputting of the test data is successfully performed, the output unit 32 outputs an instruction to delete the test data which has been output.

When outputting of the test data is successfully performed by the output unit 32, the input-information transmitting unit 26A transmits an electronic mail (hereinafter referred to as a "success mail") containing information indicating success in the outputting and setting information in the body, to the transmission source. In contrast, when outputting of the test data fails to be performed by the output unit 32, the input-information transmitting unit 26A transmits an electronic mail (hereinafter referred to as a "failure mail") containing information indicating failure of the outputting and setting information, to the transmission source. The success described above indicates that the output unit 32 successfully outputs the test data to the output destination. The failure described above indicates that the output unit 32 fails to output the test data to the output destination, for example, due to an error in the setting information.

The user uses the terminal 12A to receive the success mail or the failure mail transmitted from the image reading apparatus 10A, and to check whether or not the setting information which has been transmitted to the image reading apparatus 10A is right information.

The image reading unit 36 according to the first exemplary embodiment reads a document on the basis of a user instruction, and outputs image data obtained through the reading, to an output destination in accordance with the setting information.

The information processing apparatus 20A and the terminal 12A described above are implemented by using a computer 50 and a computer 70, respectively, included in the computer system illustrated in FIG. 5.

The computer 50 according to the first exemplary embodiment includes a central processing unit (CPU) 52, a memory 54 serving as a temporary storage area, and the nonvolatile storage 34. The computer 50 also includes an input/output interface (I/F) 58 connected to the input/output device 56 including the display device such as a touch-panel display, an input device such as hardware keys, and the like. The image reading unit 36 described above is connected to the input/output I/F 58. The computer 50 includes a read/write (R/W) unit 62 which controls reading and writing of data from/to a recording medium 60, and a network I/F 64 connected to a network 90. The CPU 52, the memory 54, the storage 34, the input/output I/F 58, the R/W unit 62, and the network I/F 64 are connected to one another via a bus 66.

The storage 34 is implemented by using a hard disk drive (HDD), a solid state drive (SSD), a flash memory, and the like. The storage 34 serving as a storage medium stores various programs for causing the computer 50 to function as the information processing apparatus 20A. The various programs include an input-information transmission program and an output-destination registration program which are described below.

The CPU 52 reads the various programs from the storage 34 so as to load the read programs on the memory 54, and sequentially performs processes invoked by the various programs. The CPU 52 executes the various programs, thereby functioning as the display controller 22, the transmission-destination accepting unit 24, the input-information transmitting unit 26A, the storing unit 28A, the setting-information receiving unit 30A, and the output unit 32 which are illustrated in FIG. 1. Thus, the computer 50 in which the various programs are installed functions as the information processing apparatus 20A.

The computer 70 according to the first exemplary embodiment includes a CPU 72, a memory 74 serving as a temporary storage area, and the nonvolatile storage 44. The computer 70 also includes an input/output I/F 78 connected to an input/output device 76 including a display device and an input device. The computer 70 includes an R/W unit 82 which controls reading and writing of data from/to a recording medium 80, and a network I/F 84 connected to the network 90. The CPU 72, the memory 74, the storage 44, the input/output I/F 78, the R/W unit 82, and the network I/F 84 are connected to one another via a bus 86.

The storage 44 is implemented by using an HDD, an SSD, a flash memory, and the like. The storage 44 serving as a storage medium stores programs for causing the computer 70 to function as the terminal 12A. The programs include an electronic-mail transmission/reception program for receiving/transmitting an electronic mail.

The CPU 72 reads the electronic-mail transmission/reception program from the storage 44 so as to load the read program in the memory 74, and sequentially performs processes invoked by the electronic-mail transmission/reception program. The CPU 72 executes the electronic-mail transmission/reception program, whereby functioning as the input-information receiving unit 40 and the setting-information transmitting unit 42A which are illustrated in FIG. 1. Thus, the computer 70 in which the electronic-mail transmission/reception program is installed functions as the terminal 12A.

Figure 6:
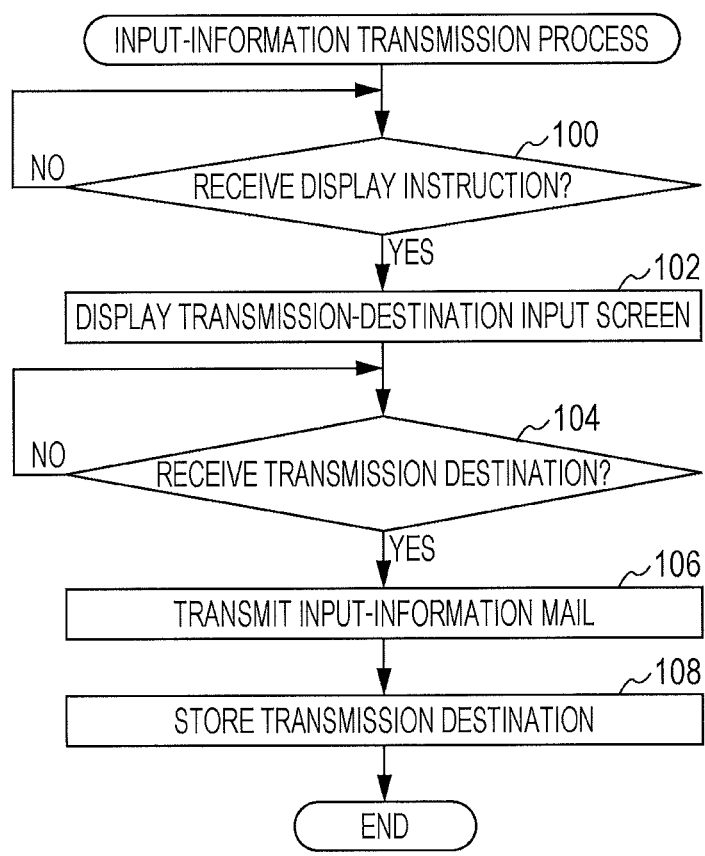
FIG. 6 is a flowchart of an exemplary input-information transmission process according to the first exemplary embodiment and a second exemplary embodiment.

Processes performed by the image reading apparatus 10A according to the first exemplary embodiment will be described. The computer 50 executes the input-information transmission program, whereby the input-information transmission process illustrated in FIG. 6 is performed.

As described above, when a user is to input setting information about a setting for the image reading apparatus 10A, the user instructs the image reading apparatus 10A to display the transmission-destination input screen, via the input/output device 56.

In step 100 performed in the input-information transmission process, the display controller 22 waits for receiving of an instruction to display the transmission-destination input screen. When the display controller 22 receives an instruction to display the transmission-destination input screen, the determination result in step 100 is affirmative, and the process proceeds to step 102. In step 102, the display controller 22 causes the transmission-destination input screen to be displayed on the display device of the input/output device 56.

As described above, when the transmission-destination input screen (see also FIG. 2) is displayed on the display device of the input/output device 56, the user inputs a transmission destination for input information, and selects the transmission button. In the next step 104, the transmission-destination accepting unit 24 waits for receiving of a transmission destination for input information. When the transmission-destination accepting unit 24 receives a transmission destination for input information, the determination result in step 104 is affirmative, and the process proceeds to step 106.

In step 106, the input-information transmitting unit 26A transmits an input-information mail (see also FIG. 3) to the transmission destination received in step 104. In the next step 108, the storing unit 28A stores the transmission destination received in step 104, as a transmission history record in the storage 34. Then, the input-information transmission process ends.

Figure 7:
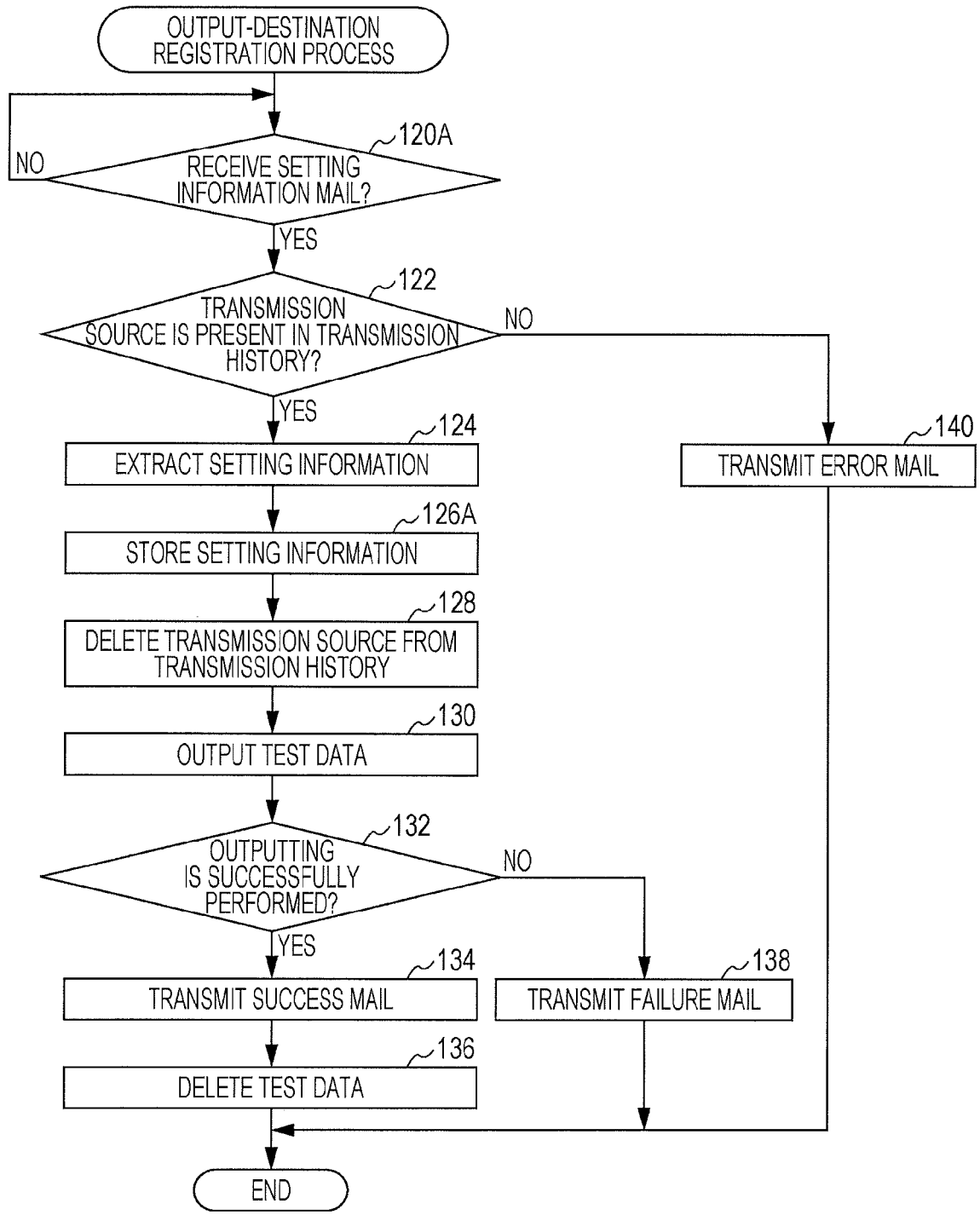
FIG. 7 is a flowchart of an exemplary output-destination registration process according to the first exemplary embodiment and a third exemplary embodiment.

The computer 50 executes the output-destination registration program, whereby the output-destination registration process illustrated in FIG. 7 is performed.

In step 120A performed in the output-destination registration process, the setting-information receiving unit 30A performs an operation for receiving an electronic mail at predetermined intervals (for example, every one minute).

As described above, when the user uses the terminal 12A to receive the input-information mail transmitted in step 106 performed in the input-information transmission process, the user transmits a setting-information mail (see also FIG. 4) in which setting information is input, as an electronic mail which is a reply to the received input-information mail.

In step 120A, when the setting-information receiving unit 30A receives the setting-information mail, the determination result in step 120A is affirmative, and the process proceeds to step 122. In step 122, the storing unit 28A determines whether or not the transmission source of the setting-information mail received in step 120A is present in the transmission history stored in the storage 34. If the determination result is affirmative, the storing unit 28A causes the process to proceed to step 124. If the determination result is negative, the process proceeds to step 140.

In step 124, the storing unit 28A extracts setting information from the body of the setting-information mail received in step 120A. In the next step 126A, the storing unit 28A stores the setting information extracted in step 124, as a setting for the image reading apparatus 10A in the storage 34. In the next step 128, the storing unit 28A deletes the transmission source of the setting-information mail received in step 120A, from the transmission history stored in the storage 34.

In step 130, the output unit 32 outputs the test data to the output destination in accordance with the setting information which is set in step 126A. In the next step 132, the output unit 32 determines whether or not outputting of the test data in step 130 is successfully performed. If the determination result is affirmative, the output unit 32 causes the process to proceed to step 134. If the determination result is negative, the process proceeds to step 138.

In step 134, the input-information transmitting unit 26A transmits the success mail described above, to the transmission source of the setting-information mail received in step 120A. In the next step 136, the output unit 32 outputs an instruction to delete the test data which has been output to the output destination in step 130, from the output destination. Then, the output-destination registration process ends. In response to outputting of the instruction, the output destination deletes the test data.

In step 138, the input-information transmitting unit 26A transmits the failure mail described above, to the transmission source of the setting-information mail received in step 120A. Then, the output-destination registration process ends.

In step 140, the input-information transmitting unit 26A transmits the error mail described above, to the transmission source of the setting-information mail received in step 120A. Then, the output-destination registration process ends.

By referring to FIG. 8, description will be made on the overall flow of the process in which an output destination is registered in the image reading apparatus 10A and which includes the input-information transmission process and the output-destination registration process which are described above.

Figure 8:
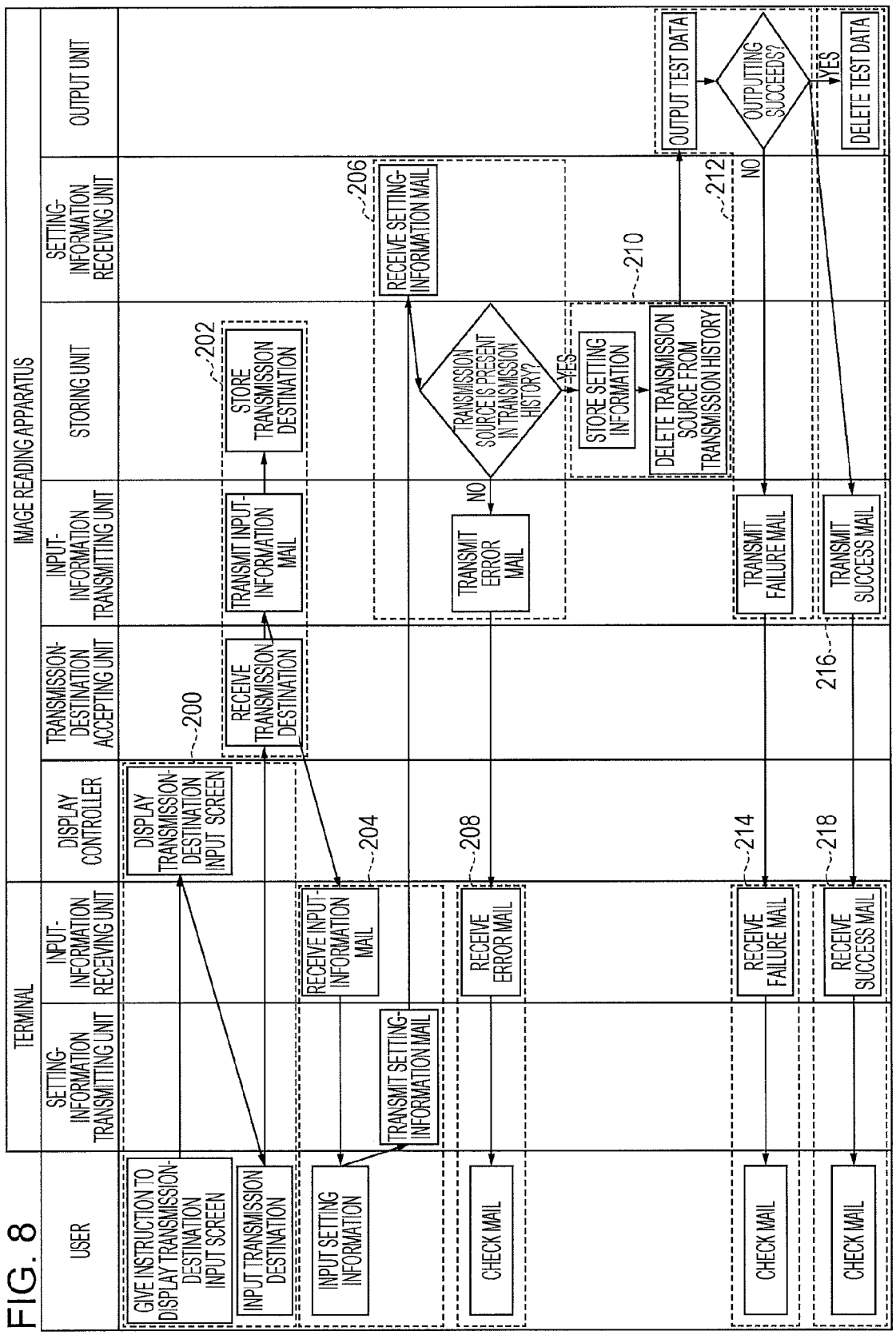
FIG. 8 is a sequence chart illustrating an exemplary overall flow of a process of registering an output destination in the image reading apparatus according to the first exemplary embodiment.

In step 200 in FIG. 8, the process in step 102 causes a user to input a transmission destination for input information via the transmission-destination input screen displayed on the display device of the input/output device 56. In the next step 202, the processes in steps 104 to 108 cause the image reading apparatus 10A to receive a transmission destination for input information, to transmit an input-information mail to the transmission destination, and to store the transmission destination as a transmission history record in the storage 34.

In the next step 204, the user uses the terminal 12A to receive the input-information mail, and to transmit a setting-information mail as a reply mail to the input-information mail. In the next step 206, the processes in steps 120A, 122, and 140 cause the image reading apparatus 10A to receive the setting-information mail, and to transmit an error mail to the transmission source when the transmission source of the setting-information mail is not present in the transmission history. In step 208, the user uses the terminal 12A to receive the error mail, and to check the information of the error mail.

When the transmission source of the setting-information mail is present in the transmission history, in step 210, the processes in steps 124 to 128 cause the image reading apparatus 10A to store the setting information in the storage 34, and to delete the transmission source from the transmission history.

In step 212, processes in steps 130, 132, and 138 cause the image reading apparatus 10A to output the test data to the output destination which has been set, and to transmit a failure mail to the transmission source when the outputting fails to be performed. In step 214, the user uses the terminal 12A to receive the failure mail, and to check the information of the failure mail.

When outputting of the test data is successfully performed, in step 216, the processes in steps 134 and 136 cause the image reading apparatus 10A to transmit a success mail to the transmission source, and to delete the test data from the output destination. In step 218, the user uses the terminal 12A to receive the success mail, and to check the information of the success mail.

In the first exemplary embodiment, the following case is described: the storing unit 28A stores setting information as a setting for the image reading apparatus 10A in the storage 34 when the transmission destination received from the input-information transmitting unit 26A matches the transmission source of the setting-information mail received from the setting-information receiving unit 30A; and the storing unit 28A does not store the setting information in the storage 34 when the transmission destination does not match the transmission source. However, this is not limiting. The storing unit 28A may store the setting information as a setting for the image reading apparatus 10A in the storage 34 without checking the transmission destination against the transmission source. In this case, the process in step 108 performed in the input-information transmission process and the processes in steps 122, 128, and 140 performed in the output-destination registration process are unnecessary.

Second Exemplary Embodiment

Figure 9:
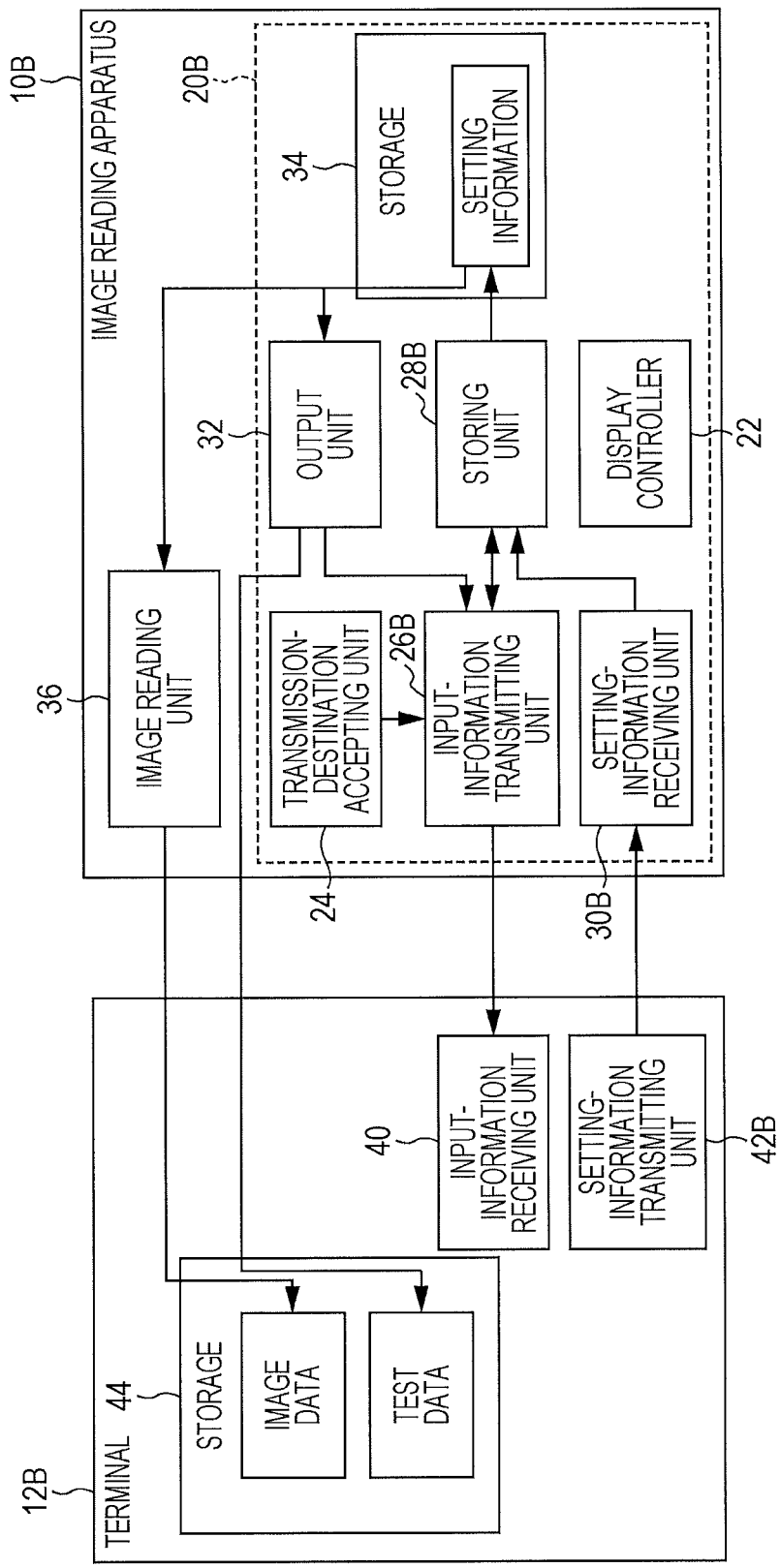
FIG. 9 is a functional block diagram illustrating the functional configuration of an image reading apparatus and a terminal according to the second exemplary embodiment.

FIG. 9 illustrates an image reading apparatus 10B and a terminal 12B according to a second exemplary embodiment. In FIG. 9, components having the same functions as those in FIG. 1 are designated with the same reference numerals as those in FIG. 1, and will not be described. Similarly to the first exemplary embodiment, an information processing apparatus 20B of the image reading apparatus 10B and the terminal 12B are implemented by using the computer 50 and the computer 70 (see FIG. 5), respectively.

An input-information transmitting unit 26B of the information processing apparatus 20B according to the second exemplary embodiment transmits an input-information mail to a transmission destination received from the transmission-destination accepting unit 24. FIG. 10 illustrates an exemplary input-information mail.

As illustrated in FIG. 10, the body of an input-information mail according to the second exemplary embodiment contains, as input information, a HyperText Transfer Protocol Secure (HTTPS) uniform resource locator (URL) for accessing a setting-information input screen for inputting setting information. A Hypertext Transfer Protocol (HTTP) URL may be used as input information.

When a user uses the terminal 12B to receive the input-information mail, the user selects the URL described in the body of the input-information mail so as to access the setting-information input screen. FIG. 11 illustrates an exemplary setting-information input screen displayed on the display device of the input/output device 76 of the terminal 12B.

As illustrated in FIG. 11, entry fields for individually inputting a registration name, an output destination, a user ID, and a password which are exemplary setting information, and a transmission button are displayed on the setting-information input screen according to the second exemplary embodiment. When the setting-information input screen is displayed, the user uses the terminal 12B to input information corresponding to the entry fields, and to select the transmission button. When the transmission button on the setting-information input screen is selected, a setting-information transmitting unit 42B of the terminal 12B transmits the setting information to the image reading apparatus 10B.

A setting-information receiving unit 30B of the information processing apparatus 20B receives the setting information transmitted from the terminal 12B. The setting-information receiving unit 30B also outputs the received setting information to a storing unit 28B. The storing unit 28B stores the setting information received from the setting-information receiving unit 30B, as a setting for the image reading apparatus 10B in the storage 34.

Processes performed by the image reading apparatus 10B according to the second exemplary embodiment will be described. As described above, the input-information transmission process according to the second exemplary embodiment is different from that according to the first exemplary embodiment (see FIG. 6) in that the body of the input-information mail is different from that in the first exemplary embodiment, and will not be described.

Figure 12:
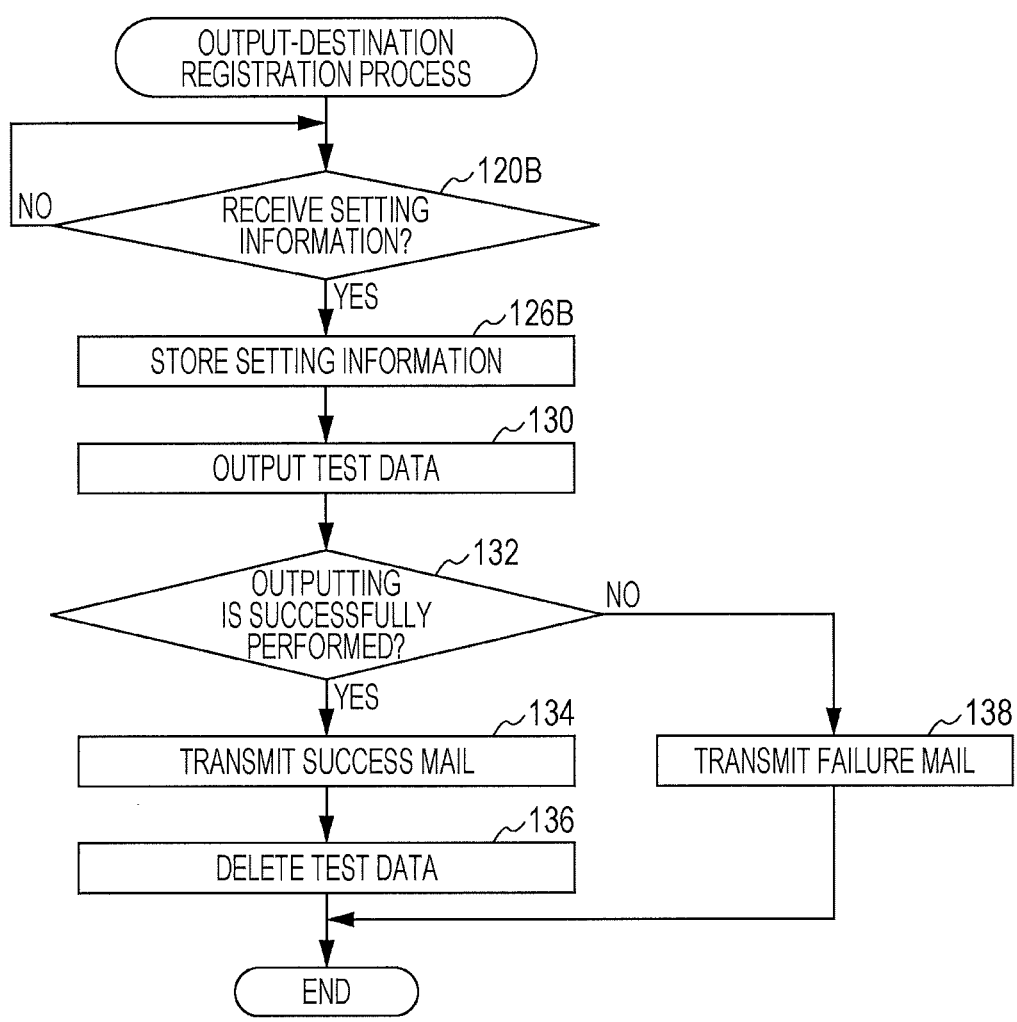
FIG. 12 is a flowchart of an exemplary output-destination registration process according to the second exemplary embodiment and the third exemplary embodiment.

The computer 50 executes the output-destination registration program, whereby the output-destination registration process illustrated in FIG. 12 is performed. In FIG. 12, steps in which the same processes as those in FIG. 7 are performed are designated with the same step numbers as those in FIG. 7, and will not be described.

As described above, a user uses the terminal 12B to receive the input-information mail, and to transmit setting information via the setting-information input screen. In step 120B performed in the output-destination registration process, the setting-information receiving unit 30B waits for receiving of setting information. When the setting-information receiving unit 30B receives the setting information transmitted from the terminal 12B, the determination result in step 120B is affirmative, and the process proceeds to step 126B.

In step 126B, the storing unit 28B stores the setting information received in step 120B, as a setting for the image reading apparatus 10B in the storage 34.

In the second exemplary embodiment, the transmission destination received in step 104 performed in the input-information transmission process may be used as the transmission destination of the success mail in step 134 and the transmission destination of the failure mail in step 138.

In the second exemplary embodiment, description is made on the case in which a URL for accessing the setting-information input screen is described in the body of the input-information mail. However, this is not limiting. For example, the input-information transmitting unit 26B may transmit an electronic mail to which a HyperText Markup Language (HTML) file corresponding to the setting-information input screen is attached, as the input-information mail. In this exemplary embodiment, a user uses the terminal 12B to receive the input-information mail, and to refer to the HTML file attached to the input-information mail, thereby accessing the setting-information input screen. Similarly to the second exemplary embodiment, the user uses the terminal 12B to input information corresponding to the entry fields, and to select the transmission button.

In the second exemplary embodiment, for example, the input-information transmitting unit 26B may add a string that corresponds to the transmission destination which is to be a recipient address of the input-information mail and that is unique for each transmission destination, to the URL in the body of the input-information mail. In this exemplary embodiment, the storing unit 28B stores the string added by the input-information transmitting unit 26B, as a transmission history record in the storage 34. The storing unit 28B extracts the string from the URL accessed by the terminal 12B, and determines whether or not the extracted string is present in the transmission history. If the storing unit 28B determines that the extracted string is present in the transmission history, the storing unit 28B performs the processes after step 126B. If the storing unit 28B determines that the obtained string is not present in the transmission history, similarly to the first exemplary embodiment, the input-information transmitting unit 26B transmits an error mail.

As described above, according to the second exemplary embodiment, a URL to be accessed is described in the body of an electronic mail.

Third Exemplary Embodiment

Figure 13:
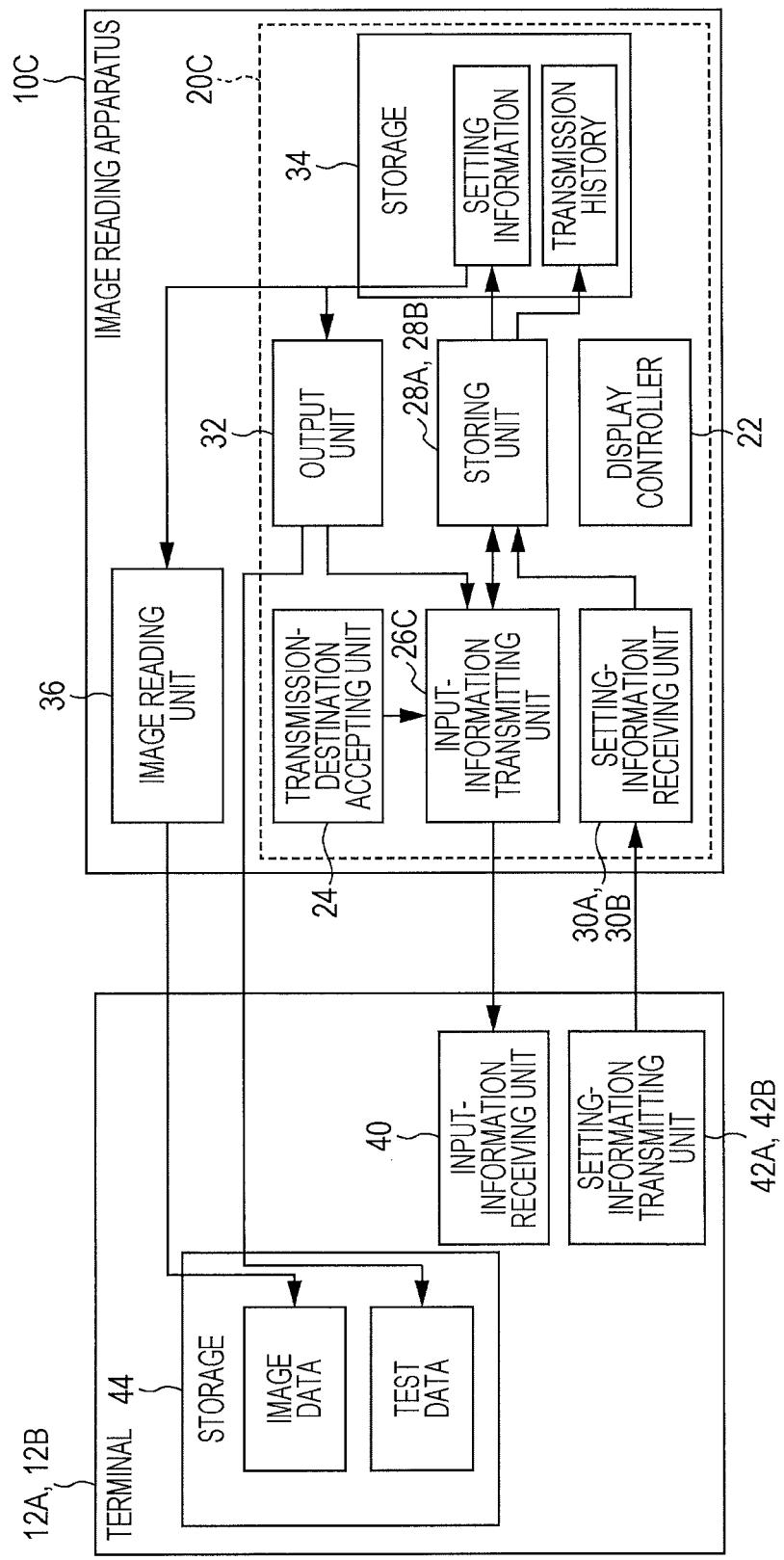
FIG. 13 is a functional block diagram illustrating the functional configuration of an image reading apparatus and a terminal according to the third exemplary embodiment.

FIG. 13 illustrates an image reading apparatus 10C and the terminal 12A (12B) according to a third exemplary embodiment. In FIG. 13, components having the same functions as those in FIGS. 1 and 9 are designated with the same reference numerals as those in FIGS. 1 and 9, and will not be described. Similarly to the first exemplary embodiment, an information processing apparatus 20C of the image reading apparatus 10C is implemented by using the computer 50 (see FIG. 5).

An input-information transmitting unit 26C of the information processing apparatus 20C according to the third exemplary embodiment transmits a different input-information mail in accordance with whether or not first organization information indicating an organization managing the image reading apparatus 10C matches second organization information indicating an organization of the transmission destination received from the transmission-destination accepting unit 24.

Specifically, when the domain of an electronic mail address which is exemplary first organization information of the image reading apparatus 10C matches the domain of an electronic mail address which is exemplary second organization information of the transmission destination, the input-information transmitting unit 26C transmits an input-information mail similar to that in the first exemplary embodiment.

In contrast, when the domain of the image reading apparatus 10C does not match the domain of the transmission destination, the input-information transmitting unit 26C transmits input information to the transmission destination so that setting information is transmitted from the transmission destination in an encrypted manner. Specifically, when the domain of the image reading apparatus 10C does not match the domain of the transmission destination, the input-information transmitting unit 26C transmits input-information mail containing an HTTPS URL similar to that in the second exemplary embodiment in the body, to the transmission destination.

Figure 14:
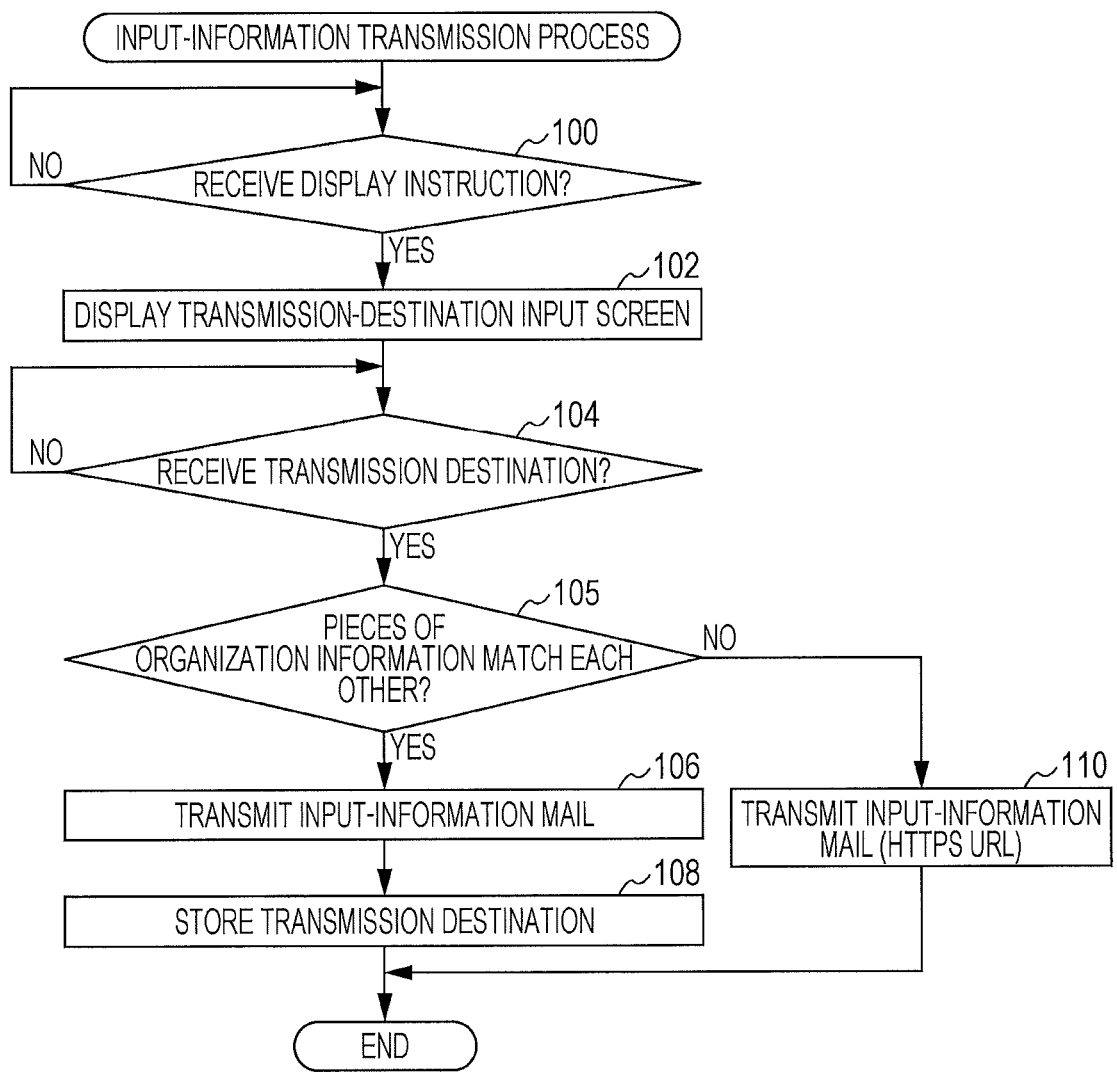
FIG. 14 is a flowchart of an exemplary input-information transmission process according to the third exemplary embodiment.

Processes performed by the image reading apparatus 10C according to the third exemplary embodiment will be described. The computer 50 executes the input-information transmission program, whereby the input-information transmission process illustrated in FIG. 14 is performed. In FIG. 14, steps in which the same processes as those in FIG. 6 are performed are designated with the same step numbers as those in FIG. 6, and will not be described.

In step 105 performed in the input-information transmission process, the input-information transmitting unit 26C determines whether or not the domain of the electronic mail address of the image reading apparatus 10C matches the domain of the transmission destination received in step 104. If the determination result is affirmative, the input-information transmitting unit 26C causes the process to proceed to step 106. If the determination result is negative, the input-information transmitting unit 26C causes the process to proceed to step 110.

In step 110, as described above, the input-information transmitting unit 26C transmits an input-information mail containing an HTTPS URL similar to that in the second exemplary embodiment in the body, to the transmission destination received in step 104. Then, the input-information transmission process ends.

In the output-destination registration process according to the third exemplary embodiment, when the image reading apparatus 10C receives a setting-information mail transmitted from the terminal 12A, the image reading apparatus 10C may perform processes similar to those in the first exemplary embodiment; and, when the image reading apparatus 10C receives setting information transmitted via the setting-information input screen from the terminal 12B, the image reading apparatus 10C may perform processes similar to those in the second exemplary embodiment. Therefore, the output-destination registration process will not be described.

In the above-described exemplary embodiments, description is made on the case in which output destination information indicating an output destination of image data is used as setting information. However, this is not limiting. For example, reading parameters, such as a resolution used when an image is read and a type regarding monochrome or color reading, may be used as setting information. Alternatively, for example, an address book used to manage transmission destinations for input information, and the like may be used as setting information.

In the above-described exemplary embodiments, description is made on the case in which one type of information (output destination information) is used as setting information. However, this is not limiting. For example, multiple types of information such as both of output destination information and an address book may be used as setting information. In this exemplary embodiment, the image reading apparatus may display the transmission-destination input screen in such a manner that any of the multiple types of information which is to be set may be selected.

In this exemplary embodiment, for example, a user selects a terminal setting button for performing a setting operation by using a terminal, on setting screens for individually performing the multiple types of setting operations, whereby the image reading apparatus displays the transmission-destination input screen. The image reading apparatus switches input information described in the body of the electronic mail which is to be transmitted to the transmission destination, in accordance with which type of setting screen was used when the terminal setting button was selected. In this case, in addition to the transmission destination for input information, the image reading apparatus may store type information indicating which type of setting is described in the input information transmitted to the transmission destination, as a transmission history record in the storage in association with the transmission destination.

In this case, when authentication by using an ID card or the like is allowed to be performed, the image reading apparatus may also store the authenticated user ID as a transmission history record in the storage in association with the transmission destination. When authentication is successfully performed by using an ID card or the like after a setting is registered, the image reading apparatus may make an automatic transition from the login screen to a type of setting screen indicated by the type information stored in the transmission history record corresponding to the authenticated user ID.

In the above-described exemplary embodiments, description is made on the case in which information about a setting for the image reading apparatus is used as setting information. However, this is not limiting. For example, setting information about a setting for an apparatus other than the image reading apparatus, such as a setting for an application of the information processing apparatus, may be used as setting information.

In the above-described exemplary embodiments, description is made on the case in which only input information is transmitted to the transmission destination. However, this is not limiting. For example, in addition to input information, support information for supporting input of setting information, such as help, may be transmitted.

In the above-described exemplary embodiments, a mobile terminal, such as a smartphone or a tablet, may be used as a terminal. In this exemplary embodiment, for example, the image reading apparatus may transmit input information by using a transmission method other than an electronic mail. In this exemplary embodiment, for example, the image reading apparatus displays information for accessing the setting-information input screen, as a quick response (QR) Code® on a display device. A user reads the QR code by using a camera or the like of the mobile terminal, whereby the setting-information input screen is accessed. Alternatively, the image reading apparatus may transmit input information to a mobile terminal through short distance communication, such as near field communication (NFC) or Bluetooth®.

In this case, for example, when a user selects a setting-information input button on the image reading apparatus, information indicating a waiting status in short distance communication is displayed on an operation panel of the image reading apparatus. Specifically, for example, in the case of NFC, a screen for showing a guidance on an operation of touching the image reading apparatus with a terminal at a touch position in order to perform communication using NFC (for example, a display screen showing a message "Let your terminal touch the image reading apparatus at the touch position.") is displayed on the operation panel of the image reading apparatus. When the user lets the mobile terminal touch the image reading apparatus at the touch position, the mobile terminal obtains input information (for example, a URL indicating the image reading apparatus which is to be connected) for inputting setting information, from the image reading apparatus. At that time, the mobile terminal may transmit the identification information (for example, the serial number or the like of the mobile terminal) for identifying the mobile terminal to the image reading apparatus. The user uses the mobile terminal to transmit setting information which is input by using the obtained input information, to the image reading apparatus. Specifically, for example, the user inputs setting information on a setting screen accessed by using the obtained URL, and transmits the setting information.

The image reading apparatus may be configured so as to accept access only from a mobile terminal whose identification information matches the transmitted identification information in the case where the mobile terminal transmits the identification information to the image reading apparatus. The image reading apparatus may be configured so as to cause a user to input, for example, an authentication number (for example, 4-digit number or the like) displayed on a screen for showing a guidance on an operation of touching the image reading apparatus with a mobile terminal, when the setting screen is to be accessed, in the case where the mobile terminal does not transmit the identification information to the image reading apparatus. When the user selects a registration button after input of setting information on the setting screen, a setting corresponding to the setting information is registered in the image reading apparatus, and a transition to a confirmation screen for confirming the registered setting is made.

In the case of using Bluetooth or the like, at a timing at which a user operates the image reading apparatus to select the setting-information input button, the image reading apparatus displays a list of Bluetooth-compatible devices which are present around the image reading apparatus, on the display of the image reading apparatus. The user selects the mobile terminal operated by the user from the list displayed on the display, and starts establishing a connection using Bluetooth. After the user inputs setting information on the screen which is used to input setting information and which is obtained from the image reading apparatus, when the user selects the registration button, a setting corresponding to the setting information which is input is registered in the image reading apparatus.

In the above-described exemplary embodiments, a mobile terminal, such as a smartphone or a tablet, may be used as a terminal, and an input application for inputting setting information may be installed in advance in the mobile terminal. In this exemplary embodiment, for example, the image reading apparatus transmits type information indicating the type of the image reading apparatus, by using short distance communication or the like to the mobile terminal. For example, the input application then switches input information in accordance with the setting items for each piece of type information, and displays the input information on the display of the mobile terminal. In further another exemplary embodiment, the input application holds an input history of setting information which has been input by the user. When input information is displayed on the mobile terminal, the input history of setting information which has been input is displayed.

In the above-described exemplary embodiments, description is made on use of various programs stored (installed) in advance in the storage 34. However, this is not limiting. The various programs may be provided by recording the programs in a recording medium, such as a compact disk read only memory (CD-ROM), a digital versatile disk read only memory (DVD-ROM), or a Universal Serial Bus (USB) memory. Alternatively, the various programs may be downloaded from an external apparatus via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus configured with a processor, memory and storage media, the processor configured to perform the following:
   accept a transmission destination of input information for inputting setting information about a setting for the information processing apparatus;
   transmit the input information to the transmission destination accepted by the accepting unit;
   receive the setting information transmitted from an external apparatus; and
   store the setting information in the storage medium as a setting for the information processing apparatus, the setting information being received by the receiving unit,
   wherein the setting information is output destination information indicating an output destination of data, and
   wherein the processor is further configured to output test data to the output destination by using the output destination information stored in the storage medium, and
   wherein, when the test data is successfully outputted the processor transmits information indicating success in the outputting, to a transmission source of the setting information received by the processor, and, when the test data is not successfully outputted, the processor transmits information indicating failure of the outputting, to the transmission source.

2. The information processing apparatus according to claim 1,
   wherein, the processor is configured to compare first first organization information indicating an organization managing the information processing apparatus with second organization information indicating an organization of the transmission destination, such that when the first and second organization matches the processor is configured to transmit the input information to the transmission destination.

3. The information processing apparatus according to claim 2,
   wherein, when the processor determines that the first organization information does not match the second organization information, the processor is configured to transmit the input information to the transmission destination in such a manner that the setting information is transmitted from the transmission destination in an encrypted manner.

4. An information processing system comprising:
   the information processing apparatus according to claim 1; and
   a transmission-destination apparatus that receives the input information transmitted by the processor of the information processing apparatus, and transmits the setting information to the information processing apparatus, the setting information being input on a basis of the received input information.

5. A non-transitory computer readable medium storing a program causing a computer to cause the processor of claim 1 to perform the accepting, transmitting, of input information, and receiving, and storing of setting information.

6. An information processing apparatus configured with a processor, memory, and storage medium, the processor configured to perform the following:
   accept a transmission destination of input information for inputting setting information about a setting for the information processing apparatus;
   transmit the input information to the transmission destination accepted by the accepting unit;
   receive the setting information transmitted from an external apparatus; and
   when a transmission source of the received setting information matches the transmission destination, stores the setting information in the storage medium as a setting for the information processing apparatus,
   wherein the setting information is output destination information indicating an output destination of data, and
   wherein the processor is further configured to output test data to the output destination by using the output destination information stored in the storage medium, and
   wherein, when the test data is successfully outputted the processor transmits information indicating success in the outputting, to the transmission source of the setting information received by the processor, and, when the test data is not successfully outputted, the processor transmits information indicating failure of the outputting, to the transmission source.

7. The information processing apparatus according to claim 6,
   wherein, the processor is configured to compare first organization information indicating an organization managing the information processing apparatus with second organization information indicating an organization of the transmission destination, such that when the first and second organization matches the processor is configured to transmit the input information to the transmission destination.

8. The information processing apparatus according to claim 7,
   wherein, when the processor determines that the first organization information does not match the second organization information, the processor is configured to transmit the input information to the transmission destination in such a manner that the setting information is transmitted from the transmission destination in an encrypted manner.

* * * * *